United States Statutory Invention Registration [19]

[11] Reg. Number: H375

Dinger [43] Published: Nov. 3, 1987

[54] MICROSTRIP ANTENNA SYSTEM ADAPTIVELY STEERABLE IN TWO DIMENSIONS

[75] Inventor: Robert J. Dinger, Ridgecrest, Calif.

[73] Assignee: The United States of America as represented by the Secretary of the Navy, Washington, D.C.

[21] Appl. No.: 21,040

[22] Filed: Mar. 2, 1987

[51] Int. Cl.[4] ..... H01Q 3/22

[52] U.S. Cl. ..... 342/372

*Primary Examiner*—Stephen C. Buczinski
*Assistant Examiner*—Linda J. Wallace
*Attorney, Agent, or Firm*—William C. Townsend; W. Thom Skeer; Stephen J. Church

[57] ABSTRACT

An antenna system for adaptive steering in azimuth and elevation. The system utilizes a cross-shaped, planar, microstrip array with a central receiving element and with arms of parasitic elements having individual phase shifters which are simultaneously adjusted. In steering a null, the phase shifters are initially adjusted in a "random search" mode and are then adjusted in a "guided random search" mode.

7 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

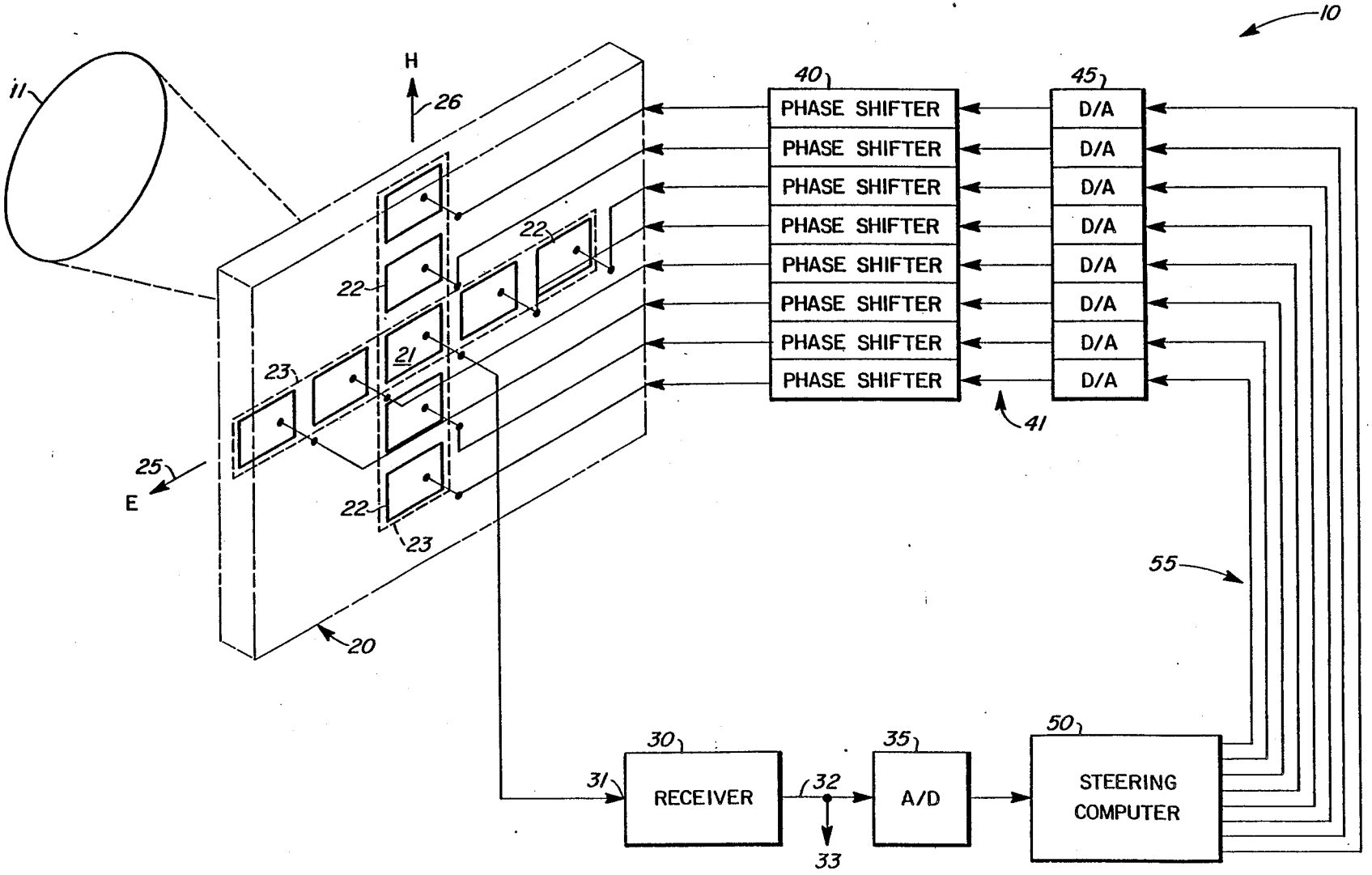
10
45
D/A
D/A
D/A
D/A
D/A
D/A
D/A
D/A
41
40
PHASE SHIFTER
PHASE SHIFTER
PHASE SHIFTER
PHASE SHIFTER
PHASE SHIFTER
PHASE SHIFTER
PHASE SHIFTER
PHASE SHIFTER
55
50
STEERING COMPUTER
35
A/D
32
33
30
RECEIVER
31
22
21
23
26
H
20
25
E
11

MICROSTRIP ANTENNA SYSTEM ADAPTIVELY STEERABLE IN TWO DIMENSIONS

BACKGROUND OF THE INVENTION

1. Field of the Invention

The present invention pertains to the field of antennas used for directive radio wave communications. More particularly it applies to microstrip antennas having a steerable array with parasitic elements and electronically controlled scanning.

2. Description of the Prior Art

It is known to utilize an antenna system having a linear microstrip array with a central receiving element and parasitic elements extended oppositely therefrom to adaptively steer an antenna pattern by phase shifters individual to the parasitic elements, such a system being particularly useful to steer a null toward an undesired microwave source. However, it is highly desirable to provide an antenna system having the compactness and simplicity of a microstrip array but steerable in azimuth and elevation in real time.

It is also known to steer such a linear microstrip array by circuits individual to the phase shifters where each such circuit has a oscillator providing a reference signal modulating the phase shifter, has a synchronous detector which receives the reference signal and the output of a receiver connected to the central elements, and has an integrator connected to the detector output and driving the phase shifter to minimize or maximize the receiver output. This manner of steering a microstrip array requires many circuit elements and is not easily adapted to other methods of steering to optimize the array pattern.

"Random search" and "guided random search" are iterative methods well-known for optimization when a number of variables must be adjusted. These methods have the advantage of rapid real-time convergence since all variables are adjusted simultaneously with the result that convergence may occur in less time than in other well-known optimization methods such as "steepest descent" where, although fewer complete iterations of all variables are required, the total time required is greater since at each iteration every variable must be adjusted individually and the effect measured.

SUMMARY OF THE INVENTION

The present invention is a microwave antenna system having a planar, cross-shaped, microstrip array with a central receiving element and orthogonally related arms consisting of parasitic elements whose phase relations are controlled by phase shifters individual thereto. The phase shifters are digitally and simultaneously controlled to steer the array in two-dimensions in relation to a radiating source by a random search mode followed by a directed random search mode.

It is an object of the present invention to provide a micro-strip antenna system steerable in azimuth and in elevation.

Another object is to provide such a system which rapidly steers an antenna pattern in relation to a radiating source.

A further object is to provide such a system particularly effective in steering a null toward such a source.

BRIEF DESCRIPTION OF THE DRAWING

Other objects, advantages, and novel features of the subject invention will become apparent from the following detailed description thereof when considered with the accompanying drawing in which the FIGURE is a schematic representation of an antenna system embodying the present invention and has, at the left side, a perspective representation of a microstrip array and a beam steered thereby and has, toward the right side, a block diagram of electronic elements used with the array.

DESCRIPTION OF THE PREFERRED EMBODIMENT

The FIGURE shows an antenna system 10 which embodies the present invention and adaptively steers an antenna pattern or beam 11 which, for illustrative convenience, is depicted as a lobe but may be a null to be directed toward an undesired source, not shown.

System 10 has a planar, cross-shaped microstrip array 20 with a central element 21 and eight parasitic elements 22. Elements 21 and 22 are of a well-known rectangular configuration and elements 21 are disposed in a pair of orthogonally related arms 23 intersecting at and extending from element 21. Elements 21 and 22 are dimensioned and spaced, in a manner well-known to those familiar with the art of microstrip array design, so that array 20 is configured for a predetermined microwave frequency with elements 21 and 22 resonant thereat. The number of elements 21 in each arm 23 may be increased to narrow beam 11. Array 20 is, typically, arranged so that the longer axis of elements 21 and 22, which defines the electric or E plane 25 of array 20, extends in azimuth and so that the shorter axis of these elements, which defines the magnetic or H plane 26 of the array, extends in elevation.

System 10 includes any suitable receiver 30 having a microwave frequency input 31, which is connected only to central element 21, and having an output 32 which provides a signal proportional to the power received by the central element at the frequency for which array 20 is configured. This signal is provided externally of system 10 for any desired purpose by a connection 33 and is provided to an analog-to-digital converter (A/D) 35 which provides a digital measurement of the microwave power received by element 21.

System 10 has eight varactor phase shifters 40 individually connected to parasitic elements 21 and having individual control inputs 41. System 10 has eight digital-to-analog converters 45 individually providing control signals to inputs 41. The construction of phase shifters 40 and their connections to array 20 and converters 45 are any well-known to the art such that each signal from a converter 45 to an input 41 has a predetermined voltage range which corresponds to a predetermined change in the phase angle of the associated one of the parasitic elements 21 in relation to the others thereof.

System 10 includes a digital steering computer 50 which accepts, through analog-to-digital converter 35, power measurements for central element 20, and which drives, by connections 55, digital-to-analog converters 45. Computer 50 is of any suitable configuration programmable to vary, substantially simultaneously and in accordance with a predetermined iterative method, the signals from converters 45 based upon the measured power from central array element 21. In order to obtain rapid convergence in such a method, the relative phase of every one of the parasitic elements 22 is varied substantially simultaneously at each iteration in relation to the others thereof and in response to one measurement of the power from element 21. This simultaneous variation is obtained by computer 50 and converters 45 simultaneously changing signals 41.

System 10 utilizes a preferred iterative method to steer beam 11 in two dimensions to obtain a predetermined power output from receiver 30, this output being a minimum when it is desired to steer a null. This method generates repeated variations of the relative phases of all of the parasitic elements, these variations forming corresponding antenna patterns resulting in different power outputs from receiver 30 corresponding to the energy received by element 21 and measurable at each variation by analog-to-digital converter 35. In the preferred method, random variations are generated within the range of the signals to phase shifter control inputs 41, and the one of such variations resulting in measured power from receiver 30 nearest to the desired power output is selected.

Initially in the preferred method, a "random search" is utilized in which the distribution of values within the input range to phase shifters 40 is determined at each variation by a random number generator so as to be distributed with a uniform density over this entire range. After a predetermined number of iterations, typically twenty, these values corresponding to the random search iteration resulting, if a null is to be steered, in the lowest power from receiver 30 are selected as the starting point for a following "guided random search".

In this guided random search, the density during successive iterations of the values within the input ranges of the phase shifters 40 is provided by Gaussian random number generator which generates a sequence with a zero mean and a predetermined standard deviation. At each iteration, the Gaussian values are output simultaneously to all the phase shifters 40 and a single measurement of the power at receiver output 32 is made. If these values reduce this power, they are used as a starting point for the next iteration; otherwise, such values from the previous iteration are used to continue the guided random search.

During the guided random search the standard deviation mentioned in the previous paragraph must not be so small that a small minimum is overlooked, but must not so large that convergence does not occur at a steep minimum. An effective standard deviation for this purpose can be determined by trial and error. However, use of the present invention with an array, which was like array 20 in having eight cross-configured parasitic elements and a range for phase shifter 40 of approximately 250 degrees from range of 10 volts on control inputs 41, gave satisfactory convergence with a standard deviation of 0.15 of the voltage range.

What is claimed is:

1. An adaptively steerable antenna system comprising:

a planar microstrip array configured for a predetermined microwave frequency and having a central element, and a plurality of parasitic elements disposed in a cross having a pair of orthogonally related arms crossing at the central element;

a receiver having an input connected only to the central element and providing an output signal proportional to the power received at said frequency by the central element;

a plurality of individually controllable phase shifting means, which are individual to the parasitic elements, for changing the phase relation of said parasitic elements at said frequency; and means for controlling each of said phase shifting means of said plurality thereof in accordance with a predetermined method to minimize said output signal.

2. The antenna system of claim 1 wherein said method is iterative and at each iteration, based on one measurement of said power received by the central element, the relative phase of substantially every one of said parasitic elements is varied in relation to the others thereof.

3. The antenna system of claim 2 wherein said method comprises a random search followed by a guided random search.

4. The antenna system of claim 1 wherein:

each of said phase shifting means accepts a control input signal having a predetermined range and shifts said phase relation of the corresponding parasitic element over a range corresponding to said predetermined range; and said controlling means provides a plurality of control input signals individually to said phase shifting means, and simultaneously changes said plurality of control input signals by a random variation within said predetermined range.

5. A method of steering in two dimensions a beam of a microwave antenna system to obtain a predetermined power output therefrom, the method comprising:

providing the system with a planar microstrip array having a central element and a plurality of parasitic elements arranged in a cross configuration with orthogonally related arms extending from the central element, a receiver having an input from the central element, a plurality of varactor phase shifters individual to the parasitic elements, and means for controlling each of said phase shifters to vary within a predetermined range the relative phase of the corresponding one of the parasitic elements in relation to the others thereof;

generating repeated variations of the relative phases of all of the parasitic elements by varying the relative phase of each thereof with a predetermined distribution within said range;

measuring the power received by the central element at each variation of said relative phases; and selecting a one of said variations having such a power output nearest to said predetermined power output.

6. The method of claim 5 wherein said predetermined power is a minimum so that a null of said antenna system is steered thereby.

7. The method of claim 5 wherein, during said repeated variations of said relative phases, said predetermined variation is initially random over said entire range and the selected one of such variations is utilized as a basis for further such repeated variations in which said predetermined variation is Gaussian.

* * * * *